(12) United States Patent
Du et al.

(10) Patent No.: US 9,704,225 B2
(45) Date of Patent: Jul. 11, 2017

(54) IMAGE ENHANCEMENT METHOD AND DEVICE BASED ON NON-CLASSICAL RECEPTIVE FIELD SUPPRESSION

(71) Applicant: Huawei Technologies Co., Ltd., Shenzhen (CN)

(72) Inventors: Xinyu Du, Shenzhen (CN); Dong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/920,669

(22) Filed: Oct. 22, 2015

(65) Prior Publication Data

US 2016/0042502 A1  Feb. 11, 2016

Related U.S. Application Data

(63) Continuation of application No. PCT/CN2013/089404, filed on Dec. 13, 2013.

(30) Foreign Application Priority Data

Apr. 23, 2013 (CN) .......................... 2013 1 0143064

(51) Int. Cl.
*G06K 9/40* (2006.01)
*G06T 5/00* (2006.01)
(Continued)

(52) U.S. Cl.
CPC .............. *G06T 5/003* (2013.01); *G06T 5/007* (2013.01); *G06T 5/20* (2013.01); *G06T 5/40* (2013.01);
(Continued)

(58) Field of Classification Search
CPC G06T 5/003; G06T 5/007; G06T 5/20; G06T 5/40; G06T 7/40–7/49;
(Continued)

(56) References Cited

U.S. PATENT DOCUMENTS

| 2005/0163393 A1* | 7/2005 | Asari ...................... G06T 5/009 |
| | | 382/254 |
| 2006/0066911 A1* | 3/2006 | Miller ...................... G06T 7/13 |
| | | 358/3.27 |

(Continued)

FOREIGN PATENT DOCUMENTS

| CN | 1892696 A | 1/2007 |
| CN | 101930592 A | 12/2010 |

(Continued)

OTHER PUBLICATIONS

Ghosh et al., "Image Enhancement by High-Order Gaussian Derivative Filters Simulating Non-Classical Receptive Fields in the Human Visual System," pp. 453-458, Springer-Verlag, Berlin, Germany (2005).

(Continued)

*Primary Examiner* — Stephen R Koziol
*Assistant Examiner* — Timothy Choi
(74) *Attorney, Agent, or Firm* — Leydig, Voit & Mayer, Ltd.

(57) ABSTRACT

An image enhancement method calculates a central response value of a target pixel based on an original pixel value of the target pixel. The method includes calculating a first total suppression value of the target pixel, where the values of suppression to the target pixel from the neighborhood pixels refer to values representing suppression effects imposed by the neighborhood pixels on the target pixel. When the central response value is greater than the first total suppression value, the first total suppression value is subtracted from the central response value, and the difference is used as a pixel value of the target pixel after image enhancement. When the central response value is less than the first total suppression value, a value 0 is used as a pixel value of the target pixel after image enhancement.

10 Claims, 8 Drawing Sheets

(51) Int. Cl.
*G06T 5/20* (2006.01)
*G06T 5/40* (2006.01)
*G06T 7/90* (2017.01)

(52) U.S. Cl.
CPC ...... *G06T 7/90* (2017.01); *G06T 2207/20192* (2013.01)

(58) Field of Classification Search
CPC . G06T 2207/20012; G06T 2207/20172; G06T 2207/20182; G06T 2207/20192
See application file for complete search history.

(56) References Cited

U.S. PATENT DOCUMENTS

2010/0040303 A1  2/2010 Bosco et al.
2011/0218762 A1* 9/2011 Chen ................. G01B 11/24
                                                    702/167

FOREIGN PATENT DOCUMENTS

| CN | 102306378 A | 1/2012 |
|---|---|---|
| CN | 102682432 A | 9/2012 |
| EP | 1605403 A1 | 12/2005 |

OTHER PUBLICATIONS

Grigorescu et al., "Contour Detection Based on Nonclassical Receptive Field Inhibition," IEEE Transactions on Image Processing, vol. 12, Issue 7, pp. 729-739, Institute of Electrical and Electronics Engineers, New York, New York (Jul. 2003).

Wei et al., "Compact Image Representation Model Based on Both nCRF and Reverse Control Mechanisms," IEEE Transactions on Neural Networks and Learning Systems, vol. 23, Issue 1, pp. 150-162, Institute of Electrical and Electronics Engineers, New York, New York (Jan. 2012).

Zeng et al., "Center-surround interaction with adaptive inhibition: A computational model for contour detection," Neuroimage, vol. 55, pp. 49-66 (Mar. 2011).

Du, "Research on Several Image Processing Problems as the Simulation of Vision Mechanisms," Doctoral Dissertation, University of Electronic Science and Technology of China, Chengdu, China (Dec. 15, 2012).

* cited by examiner

IMAGE ENHANCEMENT METHOD AND DEVICE BASED ON NON-CLASSICAL RECEPTIVE FIELD SUPPRESSION

CROSS REFERENCE

This application is a continuation of International Patent Application No. PCT/CN2013/089404 filed on Dec. 13, 2013, which claims priority to Chinese Patent Application No. 201310143064.2, filed on Apr. 23, 2013, both of which are hereby incorporated by reference in their entireties.

TECHNICAL FIELD

Embodiments of the present invention relate to the field of image processing, and in particular, to an image enhancement method and device.

BACKGROUND

An image enhancement technology is one of key technologies in the field of image processing, and the technology is used for improving and promoting quality of an original image, and even revealing information hidden in the original image, so that the original image is more suitable for observation of a human visual system or subsequent processing of another functional module. The image enhancement technology has important application in fields, such as remote sense, dynamic scene analysis, automatic navigation, and medical image analysis.

Currently, performing image enhancement by means of gamma correction is most frequently used in the image enhancement technology, and the principle thereof is performing power transformation on a pixel grayscale of an input image, as shown in the following formula:

$$s = cr^\gamma$$

where, c, γ are positive constants, and r, s are respectively pixel grayscales of an input image and an output image.

Because simple power transformation is performed only on the input image according to the foregoing technology, only an overall luminance of the image can be adjusted, and an enhanced image is rough.

SUMMARY

Embodiments of the present invention provide an image enhancement method and device, which can achieve that an enhanced image is delicate.

According to a first aspect, an embodiment of the present invention provides an image enhancement method, including:

calculating a central response value of a target pixel based on an original pixel value of the target pixel, where the central response value is greater than the original pixel value;

calculating a first total suppression value of the target pixel, where the first total suppression value is the sum of values of suppression to the target pixel from all neighborhood pixels of the target pixel, the neighborhood pixels are specified as neighborhood pixels of the target pixel in advance, and the values of suppression to the target pixel from the neighborhood pixels refer to values representing suppression effects imposed by the neighborhood pixels on the target pixel; and when the central response value is greater than the first total suppression value, subtracting the first total suppression value from the central response value, to obtain a difference, and using the difference as a pixel value of the target pixel after image enhancement; or when the central response value is less than the first total suppression value, using a value 0 as a pixel value of the target pixel after image enhancement.

According to a second aspect, an embodiment of the present invention provides an image enhancement device, including:

a first calculation module, a second calculation module, and an image enhancement module, where:

the first calculation module is configured to calculate a central response value of a target pixel based on an original pixel value of the target pixel, where the central response value is greater than the original pixel value;

the second calculation module is configured to calculate a first total suppression value of the target pixel, where the first total suppression value is the sum of values of suppression to the target pixel from all neighborhood pixels of the target pixel, the neighborhood pixels are specified as neighborhood pixels of the target pixel in advance, and the values of suppression to the target pixel from the neighborhood pixels refer to values representing suppression effects imposed by the neighborhood pixels on the target pixel; and the image enhancement module is configured to: when the central response value is greater than the first total suppression value, subtract the first total suppression value from the central response value, to obtain a difference, and use the difference as a pixel value of the target pixel after image enhancement; or when the central response value is less than the first total suppression value, use a value 0 as a pixel value of the target pixel after image enhancement.

In the foregoing technical solutions, a central response value of a target pixel is calculated based on an original pixel value of the target pixel, where the central response value is greater than the original pixel value; a first total suppression value of the target pixel is calculated, where the first total suppression value is the sum of values of suppression to the target pixel from all neighborhood pixels of the target pixel, the neighborhood pixels are specified as neighborhood pixels of the target pixel in advance, and the values of suppression to the target pixel from the neighborhood pixels refer to values representing suppression effects imposed by the neighborhood pixels on the target pixel; and when the central response value is greater than the first total suppression value, the first total suppression value is subtracted from the central response value, to obtain a difference, and the difference is used as a pixel value of the target pixel after image enhancement; or when the central response value is less than the first total suppression value, a value 0 is used as a pixel value of the target pixel after image enhancement. In this way, because image enhancement of the target pixel depends on the original pixel value of the target pixel and original pixel values of other neighborhood pixels, compared with the prior art in which only simple power transformation is performed on a pixel value of a pixel, an image after image enhancement is delicate in the embodiments of the present invention.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1 is a schematic flowchart of an image enhancement method according to an embodiment of the present invention.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
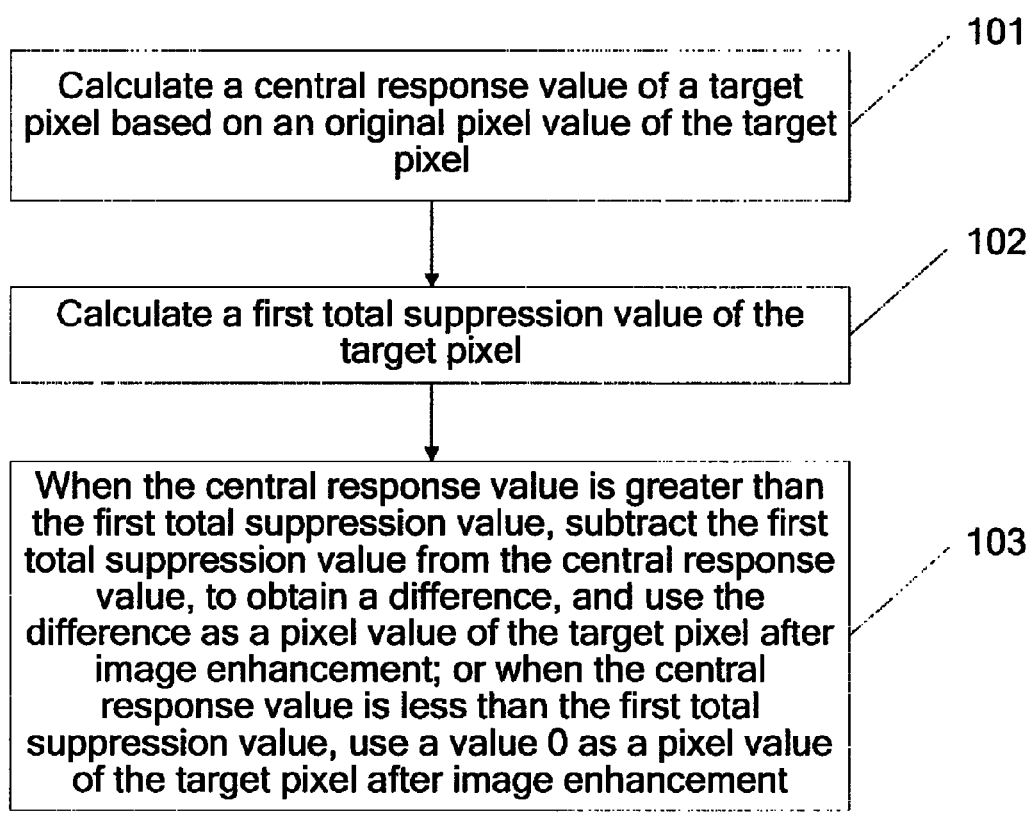

FIG. 1 is a schematic flowchart of an image enhancement method according to an embodiment of the present invention. As shown in FIG. 1, the method includes:

101: Calculate a central response value of a target pixel based on an original pixel value of the target pixel, where the central response value is greater than the original pixel value.

102: Calculate a first total suppression value of the target pixel, where the first total suppression value is the sum of values of suppression to the target pixel from all neighborhood pixels of the target pixel, the neighborhood pixels are specified as neighborhood pixels of the target pixel in advance, and the values of suppression to the target pixel from the neighborhood pixels refer to values representing suppression effects imposed by the neighborhood pixels on the target pixel.

103: When the central response value is greater than the first total suppression value, subtract the first total suppression value from the central response value, to obtain a difference, and use the difference as a pixel value of the target pixel after image enhancement; or when the central response value is less than the first total suppression value, use a value 0 as a pixel value of the target pixel after image enhancement.

Optionally, the target pixel may be one or more pixels in an image on which image enhancement needs to be performed. In the foregoing steps, it is only described that image enhancement is performed on the target pixel. In this embodiment, the image enhancement described in the foregoing steps may further be performed on other pixels in the image, that is, the image enhancement described in the foregoing steps may be performed on the entire image.

Optionally, the method may further be applied to any device supporting image processing, for example, a device such as a computer, a mobile phone, or a tablet computer.

In the foregoing technical solution, a central response value of a target pixel is calculated based on an original pixel value of the target pixel, where the central response value is greater than the original pixel value; a first total suppression value of the target pixel is calculated, where the first total suppression value is the sum of values of suppression to the target pixel from all neighborhood pixels of the target pixel, the neighborhood pixels are specified as neighborhood pixels of the target pixel in advance, and the values of suppression to the target pixel from the neighborhood pixels refer to values representing suppression effects imposed by the neighborhood pixels on the target pixel; and when the central response value is greater than the first total suppression value, the first total suppression value is subtracted from the central response value, to obtain a difference, and the difference is used as a pixel value of the target pixel after image enhancement; or when the central response value is less than the first total suppression value, a value 0 is used as a pixel value of the target pixel after image enhancement. In this way, because image enhancement of the target pixel depends on the original pixel value of the target pixel and original pixel values of other neighborhood pixels, compared with the prior art in which only simple power transformation is performed on a pixel value of a pixel, an image after image enhancement is delicate in this embodiment of the present invention.

Figure 2:
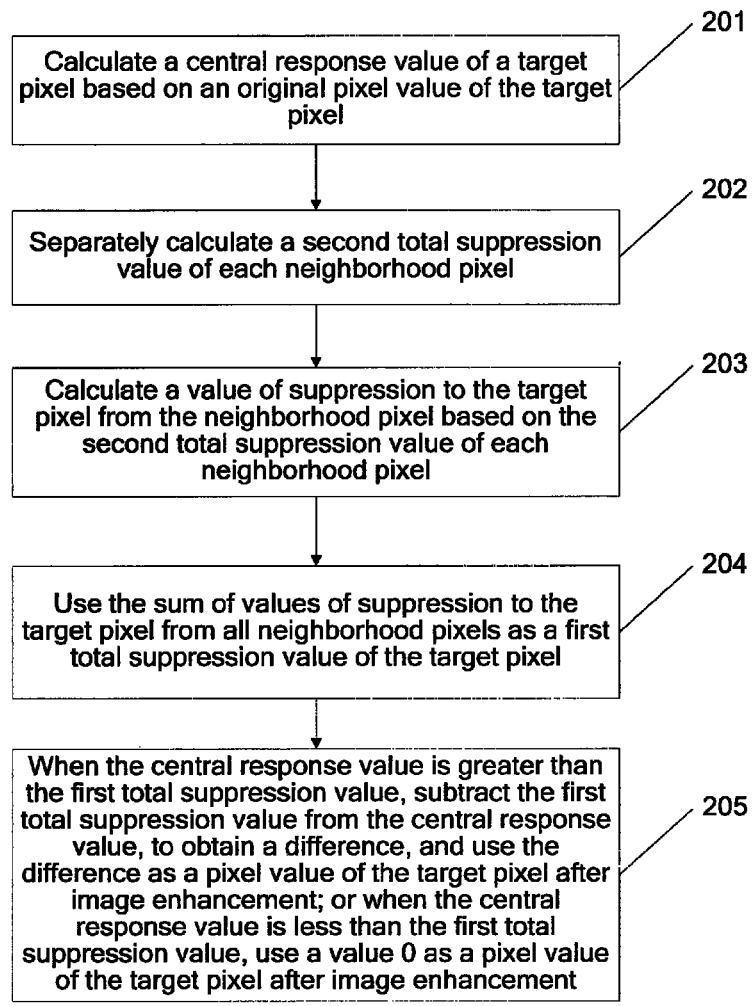
FIG. 2 is a schematic flowchart of another image enhancement method according to an embodiment of the present invention.

FIG. 2 is a schematic flowchart of another image enhancement method according to an embodiment of the present invention. As shown in FIG. 2, the method includes:

201: Calculate a central response value of a target pixel based on an original pixel value of the target pixel, where the central response value is greater than the original pixel value.

202: Separately calculate a second total suppression value of each neighborhood pixel, where the second total suppression value of the neighborhood pixel refers to the sum of values of suppression to the neighborhood pixel from other neighborhood pixels, and the other neighborhood pixels refer to all other neighborhood pixels in all the neighborhood pixels except the neighborhood pixel.

Optionally, assuming that the target pixel has 8 neighborhood pixels, calculating a second total suppression value of one of the neighborhood pixels is calculating the sum of values of suppression to the neighborhood pixel from the other 7 neighborhood pixels, where the sum of the values of suppression to the neighborhood pixel from the other 7 neighborhood pixels may also be understood as a value representing a total suppression effect imposed by the other 7 neighborhood pixels on the neighborhood pixel.

203: Calculate a value of suppression to the target pixel from the neighborhood pixel based on the second total suppression value of each neighborhood pixel, where the value of suppression to the target pixel from the neighborhood pixel is T times of a suppression difference of the neighborhood pixel, the suppression difference of the neighborhood pixel is a difference obtained by subtracting the second total suppression value of the neighborhood pixel from an original pixel value of the neighborhood pixel, or the suppression difference of the neighborhood pixel is 0, and T is a value calculated based on the original pixel value of the neighborhood pixel and a value of a distance between the neighborhood pixel and the target pixel.

Optionally, the second total suppression value of each neighborhood pixel is calculated in step 202. In this way, in step 203, the suppression difference of each neighborhood pixel may be calculated according to the second total suppression value, and then the value of suppression to the target pixel from each neighborhood pixel is obtained according to T calculated in advance based on the original pixel value of the neighborhood pixel and the value of the distance between the neighborhood pixel and the target pixel. T may be a function, or a real number value.

As an optional implementation manner, step 203 may include:

calculating a potential function of each neighborhood pixel, where the potential function of the neighborhood pixel is a norm value of a difference obtained by subtracting the original pixel value of the target pixel from the original pixel value of the neighborhood pixel;

calculating a change rate of the potential function of each neighborhood pixel, where the change rate of the potential function refers to a ratio of a power function of the potential function to power functions of all potential functions, an exponent of the power function of the potential function is the potential function, and a base of the power function of the potential function is a preset base;

calculating a kernel value of each neighborhood pixel, where the kernel value of the neighborhood pixel is a value calculated based on the change rate of the potential function of the neighborhood pixel and the value of the distance between the neighborhood pixel and the target pixel; and calculating the value of suppression to the target pixel from the neighborhood pixel based on the second total suppression value of each neighborhood pixel, where the value of suppression to the target pixel from the neighborhood pixel is T times of the suppression difference of the neighborhood pixel, the suppression difference of the neighborhood pixel is the difference obtained by subtracting the second total suppression value of the neighborhood pixel from the original pixel value of the neighborhood pixel, or the suppression difference of the neighborhood pixel is 0, and T is a value calculated based on the original pixel value of the neighborhood pixel and the kernel value of the neighborhood pixel.

Optionally, the potential function may be shown as the following formula:

$$D(x, y)=\|I_{(x, y)}-I_{(x_0, y_0)}\|_p$$

Optionally, D(x, y) represents a potential function of a neighborhood pixel (x, y), and p may be equal to 1, 2, or the like, that is, p may be 1-norm, 2-norm, or the like. $I_{(x, y)}$ represents a pixel value of the neighborhood pixel (x, y), and $I_{(x_0, y_0)}$ represents a pixel value of the target pixel.

Optionally, a change rate of D(x, y) may be shown as the following formula:

$$k(x, y) = \frac{\exp(D(x, y))}{\sum_{(x,y)\in N} \exp(D(x, y))}$$

where, k(x, y) may represent the change rate of D(x, y) of the neighborhood pixel (x, y), exp(D(x, y)) may represent a natural logarithm e raised to the power of D(x, y), N represents a set of all neighborhood pixels, that is, in the foregoing formula, the sum of exp(D(x, y)) of all the neighborhood pixels is calculated.

Optionally, the kernel value may be calculated by using the following formula:

$$\sigma'_{2,(x,y)} = \left(1 + \frac{k(x, y)}{4}\right) \cdot \sigma_2$$

where, $\sigma'_{2,(x, y)}$ represents a kernel value of the neighborhood pixel (x, y), and $\sigma_2$ is 1/H of a value of a distance between the neighborhood pixel (x, y) and the target pixel, where H is a preset numerical value, for example, H may be set to 3.

In this way, T in this implementation manner may be the value calculated based on the original pixel value of the neighborhood pixel and the kernel value of the neighborhood pixel, and the kernel value is calculated based on interaction between different neighborhood pixels and also by integrating adaptive interaction between the target pixel and the neighborhood pixels. Scalar adjustment is more fully performed on T by using information about a local contrast constituted by the target pixel and the neighborhood pixels. In this embodiment of the present invention, image enhancement implemented in this implementation manner is defined as a Variational Scalar non-classical Receptive Field (VS-NRF). In the foregoing implementation manner of calculating T based on the original pixel value of the neighborhood pixel and the value of the distance between the neighborhood pixel and the target pixel, the implemented image enhancement is defined as a Basic non-classical Receptive Field (BNRF).

204: Use the sum of values of suppression to the target pixel from all the neighborhood pixels as a first total suppression value of the target pixel.

205: When the central response value is greater than the first total suppression value, subtract the first total suppression value from the central response value, to obtain a difference, and use the difference as a pixel value of the target pixel after image enhancement; or when the central response value is less than the first total suppression value, use a value 0 as a pixel value of the target pixel after image enhancement.

Optionally, step 205 may be performed by using the following formula:

$$T=\max(T_c-T_N, 0)=\delta(T_c-T_N)$$

where, T represents the pixel value of the target pixel after image enhancement, $T_c$ represents the central response value calculated in step 201, and $T_N$ represents the first total suppression value calculated in step 204. The foregoing max operation makes a total response be a non-negative value, and implies a non-linear action, and $\delta(\cdot)$ is a Kronecker delta.

Figure 3:
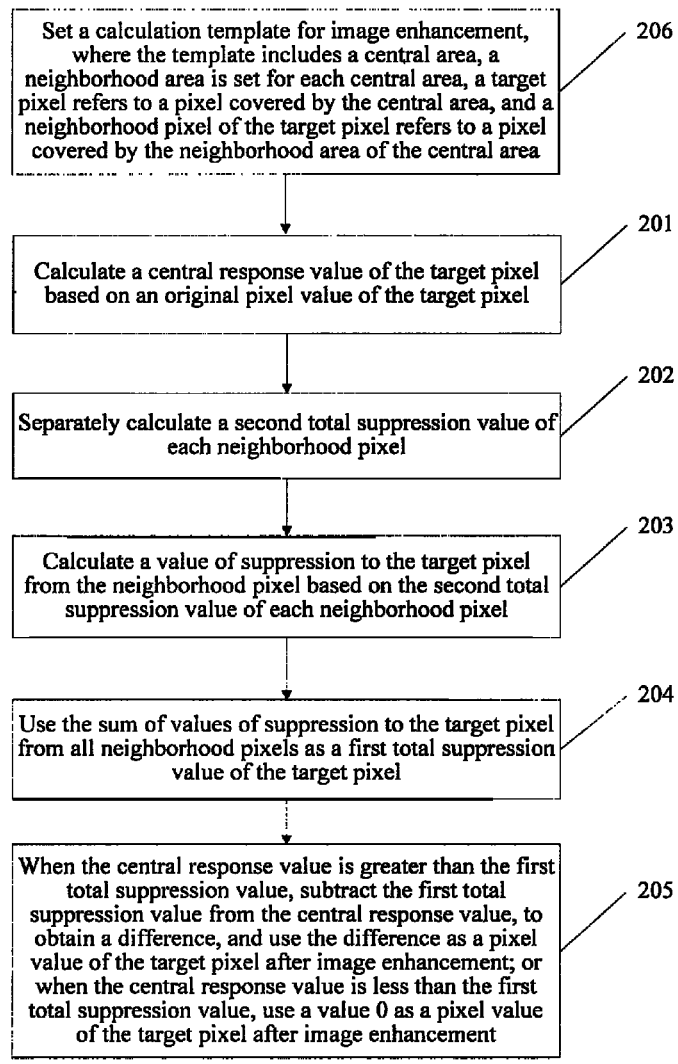
FIG. 3 is a schematic flowchart of another image enhancement method according to an embodiment of the present invention.

As an optional implementation manner, as shown in FIG. 3, before step 201, the method may further include:

206: Set a calculation template for image enhancement, where the template includes a central area, a neighborhood area is set for each central area, the target pixel refers to a pixel covered by the central area, and a neighborhood pixel of the target pixel refers to a pixel covered by the neighborhood area of the central area.

Optionally, the calculation template may be a 3×3 template, a 5×5 template, a 7×7 template, or the like. Quantities of central areas included by different templates may be different, for example, the 3×3 template includes one central area, and the 5×5 template may include one or more central areas.

Optionally, a size of the central area may be the same as that of one pixel in an image, that is, there is one target pixel; or a size of the central area may be the same as the sum of sizes of several pixels in an image, that is, there are multiple target pixels.

Optionally, when a neighborhood area that does not cover a pixel in an image in which the target pixel is located and does not cover a pixel exists in the neighborhood area of the central area, that is, the target pixel is an edge pixel of the image, the neighborhood pixel of the target pixel covered by the central area includes:

a pixel, which is covered by the neighborhood area of the central area, in the image, and a pixel, which is covered by a neighborhood area mirrored by the neighborhood area that does not cover a pixel, in the image; or a pixel, which is covered by the neighborhood area of the central area, in the image, that is, the neighborhood area that does not cover a pixel is set to 0.

Description is given below by using the 3×3 template as an example.

Figure 4:
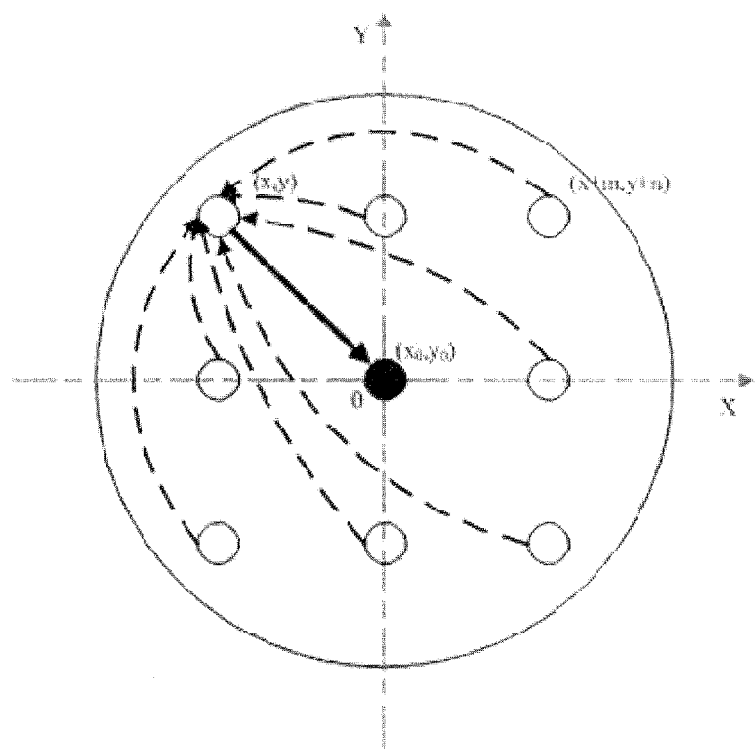
FIG. 4 is a schematic diagram of an optional calculation template according to an embodiment of the present invention.

The 3×3 template may be that shown in FIG. 4, where a black circle represents a central area, and other 8 white circles represent neighborhood areas. A coordinate system is set in the template, an origin of the coordinate system is the central area, that is, $(x_0, y_0)$, dashed lines in FIG. 4 show values of suppression to a neighborhood pixel having coordinate values of $(x, y)$ from other neighborhood pixels, the sum of all the dashed lines is a second total suppression value of the neighborhood pixel $(x, y)$, and a solid line in FIG. 4 represents a value of suppression to a target pixel $(x_0, y_0)$ from the neighborhood pixel $(x, y)$.

In the template shown in FIG. 4, step 201 may include:
calculating the central response value of the target pixel by using the following formula:

$$T_c = I_{(x_0, y_0)} A_1 G(x_0, y_0, \sigma_1)$$

where, $T_c$ represents a central response value of the target pixel $(x_0, y_0)$, and $G(x, y, \sigma) = (1/2\pi\sigma^2) \times \exp(-(x^2+y^2)/2\sigma^2)$ is a Gaussian function; $I_{(x_0, y_0)}$ represents an original pixel value of the target pixel $(x_0, y_0)$; $A_1$ is a preset response weight coefficient (for example, $A_1=4$) of the central area, $\sigma_1$ is a parameter of the Gaussian function and represents a width of a Gaussian kernel function, and $\sigma_1$ is equal to $1/J$ of a radius of a central area (that is, an area in a circle shown in FIG. 4) of the 3×3 template, where J is a preset numerical value, for example, J is 3, the radius of the central area is 0.5, and therefore, $\sigma_1 = 1/6$.

In the template shown in FIG. 4, step 202 may include:
calculating the second total suppression value of each neighborhood pixel by using the following formula:

$$II_{(x,y)} = \sum_{(x+m, y+n) \in N\setminus(x,y)} II_{(x,y)-(x+m,y+n)} A_3 G(m, n, \sigma_3)$$

where, $II_{(x, y)}$ represents a second total suppression value of the neighborhood pixel $(x, y)$, and $N\setminus(x, y)$ represents a set of all neighborhood pixels except the neighborhood pixel $(x, y)$; and $$II_{(x, y)-(x+m, y+n)} = I_{(x+m, y+n)} A_3 G(m, n, \sigma_3)$$

where, $II_{(x, y)-(x+m, y+n)}$ represents a value of suppression to the neighborhood pixel $(x, y)$ from a neighborhood pixel $(x+m, y+n)$, $A_3$ is a sensitivity coefficient (for example, $A_3=1$) between neighborhood pixels, and $\sigma_3$ is equal to $1/K$ of a distance between two neighborhood pixels that are farthest from each other in the template shown in FIG. 4, where K is a preset numerical value, for example, K is 3, and $\sigma_3=0.94$. The distance between the two neighborhood pixels that are farthest from each other in the template shown in FIG. 4 is $2\sqrt{2}$, and therefore $\sigma_3 = 2\sqrt{2}/3$.

In the template shown in FIG. 4, step 203 may include:
calculating the value of suppression to the target pixel from each neighborhood pixel by using the following formula:

$$III_{(x, y)} = \max\{A_2 G(x, y, \sigma_2)(I_{(x, y)} - II_{x, y}), 0\} = \delta(A_2 G(x, y, \sigma^2)(I_{(x, y)} - II_{(x, y)}))$$

where, $III_{(x, y)}$ represents a value of suppression to the target pixel $(x_0, y_0)$ from the neighborhood pixel $(x, y)$, $A_2$ is a sensitivity of suppression to the target pixel from a neighborhood pixel, $I_{(x, y)}$ is a pixel value of the neighborhood pixel $(x, y)$; $\sigma_2$ is a parameter of a Gaussian function, and $\sigma_2$ is equal to $1/H$ of a value of a distance between the target pixel $(x_0, y_0)$ and the neighborhood pixel $(x, y)$, where H is a preset numerical value, for example, H may be set to 3, and $\sigma_2=0.47$. A largest distance between a central point and a neighborhood pixel that are in the template shown in FIG. 4 is $\sqrt{2}$; the max operation makes a suppression effect be a non-negative value, and implies a non-linear action, and $\delta(\cdot)$ is a Kronecker delta.

Optionally, in the VSNRF implementation manner, $\sigma_2$ in the foregoing formula may be $\sigma'_{2,(x, y)}$. In the BNRF implementation manner, $\sigma_2$ in the foregoing formula may be equal to $1/H$ of the value of the distance between the target pixel $(x_0, y_0)$ and the neighborhood pixel $(x, y)$.

In the template shown in FIG. 4, step 204 may include:
using the sum of the values of suppression to the target pixel from all the neighborhood pixels as the first total suppression value of the target pixel by calculation using the following formula:

$$T_N = \sum_{(x,y) \in N} III_{(x,y)}$$

where, $T_N$ represents the first total suppression value, and N represents a set of neighborhood pixels, where there are 8 neighborhood pixels in total in this template.

As an optional implementation manner, in the foregoing method, image enhancement processing may be performed only on a grayscale image or a black-and-white image, and image enhancement processing may also be performed on a color image. However, for a color image, image enhancement processing shown in the foregoing method may be successively performed on three channels of RGB.

Figure 5:
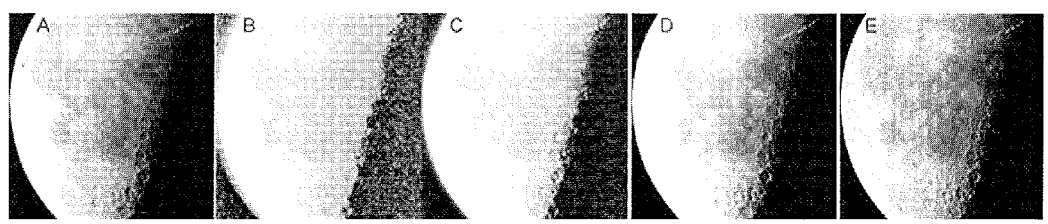
FIG. 5 is a schematic diagram of comparison of multiple image enhancement effects according to an embodiment of the present invention.

As an optional implementation manner, in this embodiment, an image on which image enhancement is performed according to this embodiment may further be compared with an image on which image enhancement is performed by using another method. Description of comparison is given by using an image of the moon (shown in FIG. 5) as an example, where the image is an image with uneven luminance distribution. A in FIG. 5 is an original image, B is an image obtained after image enhancement is performed on the original image by using a histogram equalization (HE) technology, C is an image obtained after image enhancement is performed on the original image by using a Retinex (a known image algorithm) algorithm, D is an image obtained after image enhancement is performed on the original image by using the BNRF, and E is an image obtained after image enhancement is performed on the original image by using the VSNRF. It can be seen that the VSNRF displays more detailed information, especially in a high-luminance area of the moon. For example, an area, at which an arrow points, in picture A is not lost only in picture E. It can be seen that, in the foregoing several technologies, an image enhancement effect of the VSNRF is the best.

As an optional implementation manner, an image after image enhancement may further be evaluated in the method, and specifically, the image after image enhancement may be evaluated by using at least one of the following indicators:

an EC (Evaluation of Contrast) indicator, an EME (Measure of Enhancement) indicator (where, the EC and the EME are two indicators known in the image processing field, and do not have specific Chinese meanings), and an IP (Intensity Preservation) indicator.

The EC meets the following formula:

$$EC(g) = \log\left(\log\left(\sum_n \sum_m \sqrt{G_r(n,m)^2 + G_c(n,m)^2}\right)\right)$$

where, $EC(g)$ is the EC indicator, $G_r$ and $G_c$ are results of making, horizontally and vertically in the calculation template set in this embodiment (for example, the 3×3 calculation template shown in FIG. 4), a Sobel operator act on an image (g) after image enhancement, and (n, m) is a pixel in the image. Because the Sobel operator has an edge detection function, an image enhancement action on an edge by an algorithm is measured by the EC, and a larger EC indicates a better image enhancement effect.

The EME meets the following formula:

$$EME = \frac{1}{k_1 k_2} \sum_{l=1}^{k_2} \sum_{k=1}^{k_1} 20\log\frac{I^w_{max;k,l}}{I^w_{min;k,l}}$$

where, $I^w_{max;k,l}$ and $I^w_{min;k,l}$ are respectively a largest pixel value and a smallest pixel value in a local block $W_{k,l}$ in an enhanced image. An 8×8 block is used, that is, $k_1=k_2=8$; obviously, a larger EME represents a better local contrast enhancement effect of a corresponding enhancement algorithm; a contrast enhancement effect of a local block after image enhancement is measured by using an EME operator.

Finally, the IP indicator is used for preventing an obvious difference between overall looks of an enhanced image and an original image, especially preventing an excessively large contrast in a sequential image. A difference between an average value of an original image and an average value of an enhanced image is represented by using the IP indicator. The difference being closer to 0 indicates that a corresponding image enhancement algorithm better maintains a grayscale.

Figure 6:
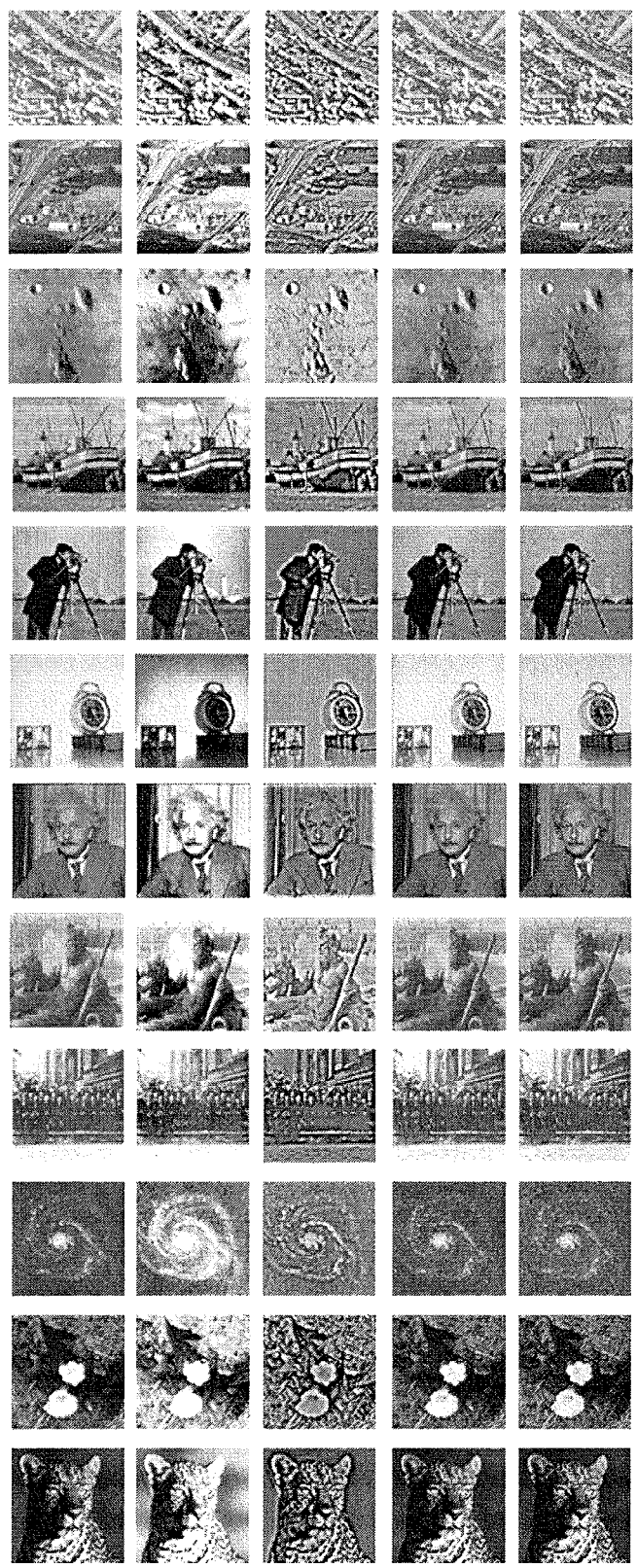
FIG. 6 is another schematic diagram of comparison of multiple image enhancement effects according to an embodiment of the present invention.

In the following, the image on which image enhancement is performed by using the HE technology, the image on which image enhancement is performed by using the Retinex technology, the image on which image enhancement is performed by using the BNRF technology, and the image on which image enhancement is performed by using the VSNRF technology are compared by comprehensively considering the foregoing three evaluation indicators, and results are shown in FIG. 6.

Original images are images in a database, and are shown as a column of images on the leftmost side of FIG. 6. Then, results of the HE technology, results of the Retinex technology, results of the BNRF technology, and results of the VSNRF technology are shown from left to right. Table 1 lists results obtained through comprehensive measurement using three indicators that are the EC, the EME, and the IP in the foregoing method. It can be seen that, the results of image enhancement performed by using the VSNRF are superior to results of image enhancement performed by using the other technologies.

As shown in Table 1, it can be objectively seen that, by means of comprehensive evaluation using the foregoing three indicators, the results of image enhancement performed in this embodiment are superior to the results of image enhancement performed by using the other technologies, and the VSNRF is superior to the BNRF. As shown in FIG. 6, it can be subjectively found that, images in the last two columns are more delicate, and human eyes feel more comfortable when seeing the enhanced images. The HE technology sometimes causes that a part of an enhanced image is excessively bright and a part thereof is excessively dark, and the Retinex algorithm sometimes causes an obvious "halo" illusion.

Results of HE, Retinex, BNRF, and VSNRF processing that are comprehensively measured by using three indicators that are the EC, the EME, and the MG are respectively shown in the following Table 1.1, Table 1.2, and Table 1.3. It can be seen that, the VSNRF is superior to the other technologies.

TABLE 1.1

| EC | Original Image | HE | Retinex | BNRF | VSNRF |
|---|---|---|---|---|---|
| Aerial1 | 2.7325 | 2.7222 | 2.7173 | 2.7579 | 2.7676 |
| Aerial2 | 2.7094 | 2.7393 | 2.7537 | 2.7405 | 2.7562 |
| Astro1 | 2.6738 | 2.7343 | 2.7308 | 2.7219 | 2.7384 |
| Barche | 2.6973 | 2.7249 | 2.7262 | 2.7288 | 2.7411 |
| Cameraman | 2.6811 | 2.7249 | 2.7262 | 2.7128 | 2.7307 |
| Clock | 2.6690 | 2.6898 | 2.6944 | 2.6943 | 2.7087 |
| Einstein | 2.6758 | 2.7212 | 2.7226 | 2.7151 | 2.7308 |
| Estatua | 2.6779 | 2.7161 | 2.7348 | 2.7221 | 2.7381 |
| Foto | 2.7218 | 2.7408 | 2.7414 | 2.7490 | 2.7581 |
| Galaxia | 2.7041 | 2.7648 | 2.7626 | 2.7545 | 2.7659 |
| Hedgebw | 2.7184 | 2.7450 | 2.7633 | 2.7478 | 2.7585 |
| Leopard | 2.7131 | 2.7312 | 2.7459 | 2.7349 | 2.7472 |

TABLE 1.2

| EME | Original Image | HE | Retinex | BNRF | VSNRF |
|---|---|---|---|---|---|
| Aerial1 | 1.8424 | 13.0828 | 11.3921 | 15.9816 | 18.4395 |
| Aerial2 | 2.2109 | 10.7939 | 17.9756 | 16.5595 | 18.1384 |
| Astro1 | 3.2349 | 11.8516 | 12.3061 | 16.1243 | 18.4072 |
| Barche | 1.9236 | 6.6218 | 15.7431 | 15.6661 | 17.1386 |
| Cameraman | 2.3704 | 6.6218 | 12.6992 | 15.7431 | 15.9882 |
| Clock | 1.0807 | 5.6812 | 8.3171 | 8.4202 | 8.6215 |
| Einstein | 8.6905 | 12.1825 | 16.4494 | 16.8699 | 17.5333 |
| Estatua | 1.2288 | 11.3932 | 13.5321 | 14.0391 | 17.2777 |
| Foto | 3.6894 | 15.5015 | 18.0091 | 18.1620 | 18.1693 |
| Galaxia | 15.3140 | 18.4292 | 18.4386 | 18.4395 | 18.4395 |
| Hedgebw | 8.7589 | 14.4589 | 18.1583 | 17.9874 | 18.0668 |
| Leopard | 9.5786 | 11.3284 | 17.1479 | 18.2038 | 18.2784 |

TABLE 1.3

| MG | Original Image | HE | Retinex | BNRF | VSNRF |
|---|---|---|---|---|---|
| Aerial1 | 0 | −13 | −24 | −10 | −13 |
| Aerial2 | 0 | 23 | 3 | −7 | −7 |
| Astro1 | 0 | 0 | 23 | −9 | −11 |
| Barche | 0 | 1 | −16 | −9 | −10 |
| Cameraman | 0 | 9 | −9 | −7 | 9 |
| Clock | 0 | −59 | −55 | −13 | −20 |
| Einstein | 0 | 19 | 11 | −7 | −9 |
| Estatua | 0 | 1 | 6 | −9 | −11 |
| Foto | 0 | −5 | 43 | −7 | −8 |
| Galaxia | 0 | 44 | 28 | 3 | 8 |
| Hedgebw | 0 | 44 | 8 | −5 | −4 |
| Leopard | 0 | 57 | 8 | −4 | −3 |

It may be further proved by using experimental data that an image on which image enhancement is performed in this embodiment conforms to a visual mechanism of humans. One of simulated visual illusion phenomena is a Mach effect, and the other one is a checkerboard effect.

Figure 7:
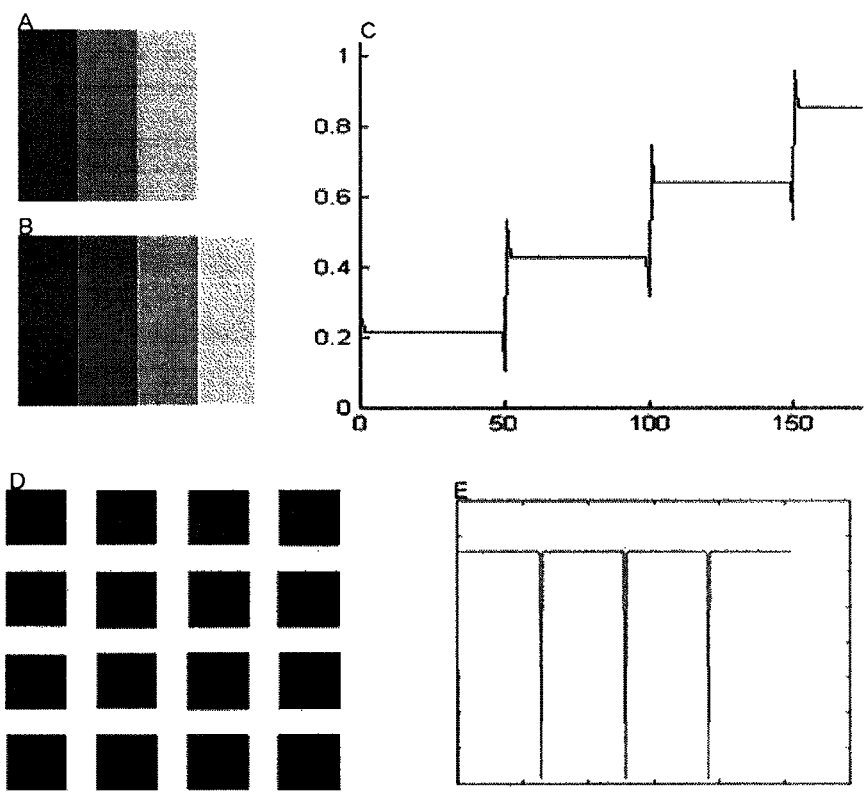
FIG. 7 is another schematic diagram of comparison of multiple image enhancement effects according to an embodiment of the present invention.

A picture A, picture B, and picture C in FIG. 7 display the Mach effect. The picture A in FIG. 7 is a step-shaped original image, and the picture B in FIG. 7 is a result picture obtained after processing in this embodiment of the present invention is performed. It can be seen that, a darker line appears in a dark area of a step edge of the picture B in FIG. 7, and similarly, a brighter line appears in a bright area, which is a Mach phenomenon in the visual illusions. The picture C in FIG. 7 is a side view of the result picture, and it can be obviously seen that the Mach effect is protuberant peaks.

A picture D and picture E in FIG. 7 display the checkerboard effect. The picture D in FIG. 7 is an original image in a checkerboard form, and human eyes may see a dark circular spot in a white intersection, which is the checkerboard effect in the visual illusions. The picture E in FIG. 7 shows hatching lines, which correspond to two areas of the side view after processing in this embodiment of the present invention, and curves that sink suddenly can be seen, which can show the circular spot illusion of the checkerboard effect.

In the foregoing technical solution, multiple optional implementation manners are described based on the foregoing embodiments, and that an image after image enhancement is delicate can be achieved in each embodiment.

Apparatus embodiments of the present invention are described in the following. The apparatus embodiments of the present invention are used for performing methods implemented in Embodiment 1 and Embodiment 2 of the method of the present invention. For the convenience of description, only a part related to the embodiments of the present invention is shown. For specific technical details that are not disclosed, refer to Embodiment 1 and Embodiment 2 of the present invention.

Figure 8:
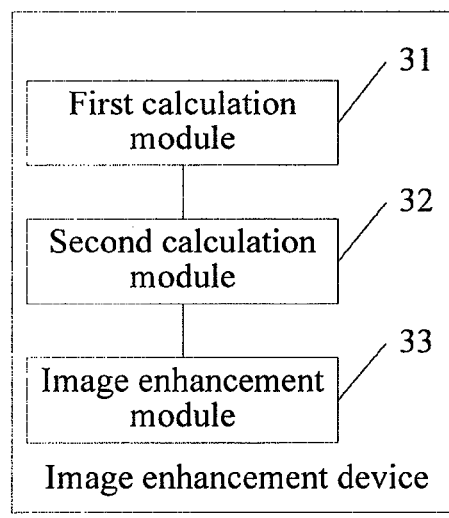
FIG. 8 is a schematic structural diagram of an image enhancement device according to an embodiment of the present invention.

FIG. 8 is a schematic structural diagram of an image enhancement device according to an embodiment of the present invention. As shown in FIG. 8, the device includes: a first calculation module 31, a second calculation module 32, and an image enhancement module 33, where the first calculation module 31 is configured to calculate a central response value of a target pixel based on an original pixel value of the target pixel, where the central response value is greater than the original pixel value;

the second calculation module 32 is configured to calculate a first total suppression value of the target pixel, where the first total suppression value is the sum of values of suppression to the target pixel from all neighborhood pixels of the target pixel, the neighborhood pixels are specified as neighborhood pixels of the target pixel in advance, and the values of suppression to the target pixel from the neighborhood pixels refer to values representing suppression effects imposed by the neighborhood pixels on the target pixel; and the image enhancement module 33 is configured to: when the central response value is greater than the first total suppression value, subtract the first total suppression value from the central response value, to obtain a difference, and use the difference as a pixel value of the target pixel after image enhancement; or when the central response value is less than the first total suppression value, use a value 0 as a pixel value of the target pixel after image enhancement.

Optionally, the target pixel may be one or more pixels in an image on which image enhancement needs to be performed. In the foregoing steps, it is only described that image enhancement is performed on the target pixel. In this embodiment, the image enhancement described in the foregoing steps may further be performed on other pixels in the image, that is, the image enhancement described in the foregoing steps may be performed on the entire image.

Optionally, the device may be any device supporting image processing, for example, a device such as a computer, a mobile phone, or a tablet computer.

In the foregoing technical solution, a central response value of a target pixel is calculated based on an original pixel value of the target pixel, where the central response value is greater than the original pixel value; a first total suppression value of the target pixel is calculated, where the first total suppression value is the sum of values of suppression to the target pixel from all neighborhood pixels of the target pixel, the neighborhood pixels are specified as neighborhood pixels of the target pixel in advance, and the values of suppression to the target pixel from the neighborhood pixels refer to values representing suppression effects imposed by the neighborhood pixels on the target pixel; and when the central response value is greater than the first total suppression value, the first total suppression value is subtracted from the central response value, to obtain a difference, and the difference is used as a pixel value of the target pixel after image enhancement; or when the central response value is less than the first total suppression value, a value 0 is used as a pixel value of the target pixel after image enhancement. In this way, because image enhancement of the target pixel depends on the original pixel value of the target pixel and original pixel values of other neighborhood pixels, compared with the prior art in which only simple power transformation is performed on a pixel value of a pixel, an image after image enhancement is delicate in this embodiment of the present invention.

Figure 9:
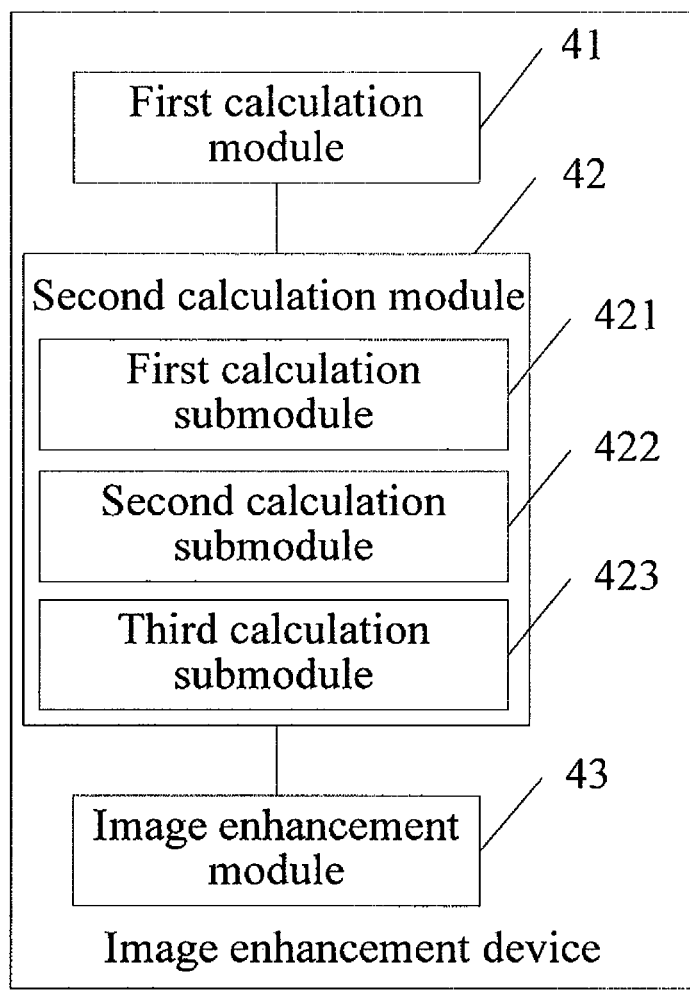
FIG. 9 is a schematic structural diagram of another image enhancement device according to an embodiment of the present invention.

FIG. 9 is a schematic structural diagram of another image enhancement device according to an embodiment of the present invention. As shown in FIG. 9, the device includes: a first calculation module 41, a second calculation module 42, and an image enhancement module 43, where the second calculation module includes a first calculation sub-module 421, a second calculation sub-module 422, and a third calculation sub-module 423.

The first calculation module 41 is configured to calculate a central response value of a target pixel based on an original pixel value of the target pixel, where the central response value is greater than the original pixel value.

The first sub-calculation sub-module 421 is configured to separately calculate a second total suppression value of each neighborhood pixel, where the second total suppression value of the neighborhood pixel refers to the sum of values of suppression to the neighborhood pixel from other neighborhood pixels, and the other neighborhood pixels refer to all other neighborhood pixels in all the neighborhood pixels except the neighborhood pixel.

Optionally, assuming that the target pixel has 8 neighborhood pixels, calculating a second total suppression value of one of the neighborhood pixels is calculating the sum of values of suppression to the neighborhood pixel from the other 7 neighborhood pixels, where the sum of the values of suppression to the neighborhood pixel from the other 7 neighborhood pixels may also be understood as a value representing a total suppression effect imposed by the other 7 neighborhood pixels on the neighborhood pixel.

The second sub-calculation sub-module 422 is configured to calculate a value of suppression to the target pixel from the neighborhood pixel based on the second total suppression value of each neighborhood pixel, where the value of suppression to the target pixel from the neighborhood pixel is T times of a suppression difference of the neighborhood pixel, the suppression difference of the neighborhood pixel is a difference obtained by subtracting the second total suppression value of the neighborhood pixel from an original pixel value of the neighborhood pixel, or the suppression difference of the neighborhood pixel is 0, and T is a value calculated in advance based on the original pixel value of the neighborhood pixel and a value of a distance between the neighborhood pixel and the target pixel.

Optionally, the first sub-calculation sub-module 421 calculates the second total suppression value of each neighborhood pixel. In this way, the second sub-calculation sub-module 422 calculates the suppression difference of each neighborhood pixel according to the second total suppression value, and then obtains the value of suppression to the target pixel from each neighborhood pixel according to T calculated in advance based on the original pixel value of the neighborhood pixel and the value of the distance between the neighborhood pixel and the target pixel. T may be a function, or a real number value.

The third sub-calculation sub-module 423 is configured to use the sum of the values of suppression to the target pixel from all the neighborhood pixels as a first total suppression value of the target pixel.

The image enhancement module 43 is configured to: when the central response value is greater than the first total suppression value, subtract the first total suppression value from the central response value, to obtain a difference, and use the difference as a pixel value of the target pixel after image enhancement; or when the central response value is less than the first total suppression value, use a value 0 as a pixel value of the target pixel after image enhancement.

Optionally, the image enhancement module 43 may further be configured to perform image enhancement on the target pixel by using the following formula:

$$T = \max(T_c - T_N, 0) = \delta(T_c - T_N)$$

where, T represents the pixel value of the target pixel after image enhancement, $T_c$ represents the central response value calculated by the first calculation module 41, and $T_N$ represents the first total suppression value calculated by the second calculation module 2. The foregoing max operation makes a total response be a non-negative value, and implies a non-linear action, and $\delta(\cdot)$ is a Kronecker delta.

As an optional implementation manner, the second sub-calculation sub-module 422 may further include:

a first calculation unit (not shown in the figure), configured to calculate a potential function of each neighborhood pixel, where the potential function of the neighborhood pixel is a norm value of a difference obtained by subtracting the original pixel value of the target pixel from the original pixel value of the neighborhood pixel;

a second calculation unit (not shown in the figure), configured to calculate a change rate of the potential function of each neighborhood pixel, where the change rate of the potential function refers to a ratio of a power function of the potential function to power functions of all potential functions, an exponent of the power function of the potential function is the potential function, and a base of the power function of the potential function is a preset base;

a third calculation unit (not shown in the figure), configured to calculate a kernel value of each neighborhood pixel, where the kernel value of the neighborhood pixel is a value calculated based on the change rate of the potential function of the neighborhood pixel and the value of the distance between the neighborhood pixel and the target pixel; and a fourth calculation unit (not shown in the figure), configured to calculate the value of suppression to the target pixel from the neighborhood pixel based on the second total suppression value of each neighborhood pixel, where the value of suppression to the target pixel from the neighborhood pixel is T times of the suppression difference of the neighborhood pixel, the suppression difference of the neighborhood pixel is the difference obtained by subtracting the second total suppression value of the neighborhood pixel from the original pixel value of the neighborhood pixel, or the suppression difference of the neighborhood pixel is 0, and T is a value calculated in advance based on the original pixel value of the neighborhood pixel and a Gaussian kernel function of the neighborhood pixel.

Optionally, the potential function may be shown as the following formula:

$$D(x, y) = \|I_{(x, y)} - I_{(x_0, y_0)}\|_p$$

Optionally, D(x, y) represents a potential function of a neighborhood pixel (x, y), and p may be equal to 1, 2, or the like, that is, p may be 1-norm, 2-norm, or the like. $I_{(x, y)}$ represents a pixel value of the neighborhood pixel (x, y), and $I_{(x_0, y_0)}$ represents a pixel value of the target pixel.

Optionally, a change rate of D(x, y) may be shown as the following formula:

$$k(x, y) = \frac{\exp(D(x, y))}{\sum_{(x,y) \in N} \exp(D(x, y))}$$

where, k(x, y) may represent the change rate of D(x, y) of the neighborhood pixel (x, y), exp(D(x, y)) may represent a natural logarithm e raised to the power of D(x, y), N represents a set of all neighborhood pixels, that is, in the foregoing formula, the sum of exp(D(x, y)) of all the neighborhood pixels is calculated.

Optionally, the kernel value may be calculated by using the following formula:

$$\sigma'_{2,(x,y)} = \left(1 + \frac{k(x, y)}{4}\right) \cdot \sigma_2$$

where, $\sigma'_{2,(x, y)}$ represents a kernel value of the neighborhood pixel (x, y), and $\sigma_2$ is 1/H of a value of a distance between the neighborhood pixel (x, y) and the target pixel, where H is a preset numerical value, for example, H may be set to 3.

In this way, T in this implementation manner may be the value calculated based on the original pixel value of the neighborhood pixel and the kernel value of the neighborhood pixel, and the kernel value is calculated based on interaction between different neighborhood pixels and also by integrating adaptive interaction between the target pixel and the neighborhood pixels. Scalar adjustment is more fully performed on T by using information about a local contrast constituted by the target pixel and the neighborhood pixels. In this embodiment of the present invention, image enhancement implemented in this implementation manner is defined as a VSNRF. In the foregoing implementation manner of calculating T based on the original pixel value of the neighborhood pixel and the value of the distance between the neighborhood pixel and the target pixel, the implemented image enhancement is defined as a BNRF.

Figure 10:
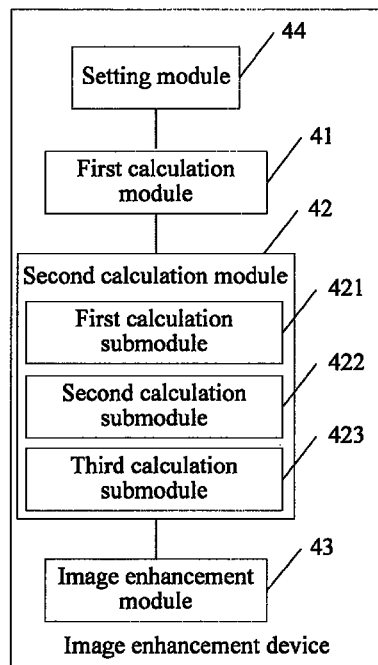
FIG. 10 is a schematic structural diagram of another image enhancement device according to an embodiment of the present invention.

As an optional implementation manner, as shown in FIG. 10, the device may further include:

a setting unit 44, configured to set a calculation template for image enhancement, where the template includes a central area, a neighborhood area is set for each central area, the target pixel refers to a pixel covered by the central area, and a neighborhood pixel of the target pixel refers to a pixel covered by the neighborhood area of the central area.

Optionally, the calculation template may be a 3×3 template, a 5×5 template, a 7×7 template, or the like. Quantities of central areas included by different templates may be different, for example, the 3×3 template includes one central area, and the 5×5 template may include one or more central areas.

Optionally, a size of the central area may be the same as that of one pixel in an image, that is, there is one target pixel; or a size of the central area may be the same as the sum of sizes of several pixels in an image, that is, there are multiple target pixels.

Optionally, when a neighborhood area that does not cover a pixel in an image in which the target pixel is located and does not cover a pixel exists in the neighborhood area of the central area, the neighborhood pixel of the target pixel covered by the central area includes:

a pixel, which is covered by the neighborhood area of the central area, in the image, and a pixel, which is covered by a neighborhood area mirrored by the neighborhood area that does not cover a pixel, in the image; or a pixel, which is covered by the neighborhood area of the central area, in the image.

Optionally, description is given below by using the 3×3 template shown in FIG. 4 as an example. A coordinate system is set in the template, an origin of the coordinate system is the central area, that is, $(x_0, y_0)$, dashed lines in FIG. 4 show values of suppression to a neighborhood pixel having coordinate values of $(x, y)$ from other neighborhood pixels, the sum of all the dashed lines is a second total suppression value of the neighborhood pixel $(x, y)$, and a solid line in FIG. 4 represents a value of suppression to a target pixel $(x_0, y_0)$ from the neighborhood pixel $(x, y)$.

In the template shown in FIG. 4, the first calculation module 41 may further calculate the central response value of the target pixel by using the following formula:

$$T_c = I_{(x_0, y_0)} A_1 G(x_0, y_0, \sigma_1)$$

where, $T_c$ represents a central response value of the target pixel $(x_0, y_0)$, and $G(x, y, \sigma) = (1/2\pi\sigma^2) \times \exp(-(x^2+y^2)/2\sigma^2)$ is a Gaussian function; $I_{(x_0, y_0)}$ represents an original pixel value of the target pixel $(x0, y0)$; $A_1$ is a preset response weight coefficient (for example, $A_1=4$) of the central area, $\sigma_1$ is a parameter of the Gaussian function and represents a width of a Gaussian kernel function, and $\sigma_1$ is equal to 1/J of a radius of a central area (that is, an area in a circle shown in FIG. 4) of the 3×3 template, where J is a preset numerical value, for example, J is 3, the radius of the central area is 0.5, and therefore, $\sigma_1=1/6$.

In the template shown in FIG. 4, the first calculation sub-module 421 may further be configured to calculate the second total suppression value of each neighborhood pixel by using the following formula:

$$II_{(x,y)} = \sum_{(x+m, y+n) \in N\backslash(x,y)} II_{(x,y)-(x+m, y+n)} A_3 G(m, n, \sigma_3)$$

where, $II_{(x, y)}$ represents a second total suppression value of the neighborhood pixel $(x, y)$, and $N\backslash(x, y)$ represents a set of all neighborhood pixels except the neighborhood pixel $(x, y)$; and $$II_{(x, y)-(x+m, y+n)} = I_{(x+m, y+n)} A_3 G(m, n, \sigma_3)$$

where, $II_{(x, y)-(x+m, y+n)}$ represents a value of suppression to the neighborhood pixel $(x+m, y+n)$ from a neighborhood pixel $(x, y)$, $A_3$ is a sensitivity coefficient (for example, $A_3=1$) between neighborhood pixels, and $\sigma_3$ is equal to 1/K of a distance between two neighborhood pixels that are farthest from each other in the template shown in FIG. 4, where K is a preset numerical value, for example, K is 3, and $\sigma_3=0.94$. The distance between the two neighborhood pixels that are farthest from each other in the template shown in FIG. 4 is $2\sqrt{2}$, and therefore $\sigma_3=2\sqrt{2}/3$.

In the template shown in FIG. 4, the second calculation sub-module 422 calculates the value of suppression to the target pixel from each neighborhood pixel by using the following formula:

$$III_{(x, y)} = \max\{A_2 G(x, y, \sigma_2)(I_{(x, y)} - II_{(x, y)}), 0\} = \delta(A_2 G(x, y, \sigma_2)(I_{(x, y)} - II_{(x, y)}))$$

where, $III_{(x, y)}$ represents a value of suppression to the target pixel $(x, y)$ from the neighborhood pixel $(x_0, y_0)$, $A_2$ is a sensitivity of suppression to the target pixel from a neighborhood pixel, $I_{(x, y)}$ is a pixel value of the neighborhood pixel $(x, y)$; $\sigma_2$ is a parameter of a Gaussian function, and $\sigma_2$ is equal to 1/H of a value of a distance between the target pixel $(x_0, y_0)$ and the neighborhood pixel $(x, y)$, where H is a preset numerical value, for example, H may be set to 3, and $\sigma_2=0.47$. The max operation makes a suppression effect be a non-negative value, and implies a non-linear action, and $\delta(\bullet)$ is a Kronecker delta.

Optionally, in the VSNRF implementation manner, $\sigma_2$ in the foregoing formula may be $\sigma'_{2,(x, y)}$. In the BNRF implementation manner, $\sigma_2$ in the foregoing formula may be equal to 1/H of the value of the distance between the target pixel $(x_0, y_0)$ and the neighborhood pixel $(x, y)$.

In the template shown in FIG. 4, the third calculation sub-module 423 may further be configured to use the sum of the values of suppression to the target pixel from all the neighborhood pixels as the first total suppression value of the target pixel by calculation using the following formula:

$$T_N = \sum_{(x, y) \in N} III_{(x, y)}$$

where, $T_N$ represents the first total suppression value, and N represents a set of neighborhood pixels, where there are 8 neighborhood pixels in total in this template.

As an optional implementation manner, the foregoing device may perform image enhancement processing only on a grayscale image or a black-and-white image, and may also perform image enhancement processing on a color image. However, for a color image, image enhancement processing shown in the foregoing method may be successively performed on three channels of RGB.

In the foregoing technical solution, multiple optional implementation manners are described based on the foregoing embodiments, and that an image after image enhancement is delicate can be achieved in each implementation manner.

Figure 11:
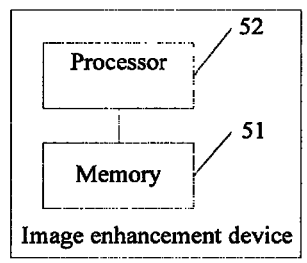
FIG. 11 is a schematic structural diagram of another image enhancement device according to an embodiment of the present invention.

FIG. 11 is a schematic structural diagram of another image enhancement device according to an embodiment of the present invention. As shown in FIG. 11, the device includes: a memory 51 and a processor 52 connected to the memory 51. The memory 51 is configured to store a set of program code, and the processor 52 is configured to invoke a program code stored in the memory 51 to perform the following operations:

calculating a central response value of a target pixel based on an original pixel value of the target pixel, where the central response value is greater than the original pixel value;

calculating a first total suppression value of the target pixel, where the first total suppression value is the sum of values of suppression to the target pixel from all neighborhood pixels of the target pixel, the neighborhood pixels are specified as neighborhood pixels of the target pixel in advance, and the values of suppression to the target pixel from the neighborhood pixels refer to values representing suppression effects imposed by the neighborhood pixels on the target pixel; and when the central response value is greater than the first total suppression value, subtracting the first total suppression value from the central response value, to obtain a difference, and using the difference as a pixel value of the target pixel after image enhancement; or when the central response value is less than the first total suppression value, using a value 0 as a pixel value of the target pixel after image enhancement.

Optionally, the target pixel may be one or more pixels in an image on which image enhancement needs to be performed. In the foregoing steps, it is only described that image enhancement is performed on the target pixel. In this embodiment, the image enhancement described in the foregoing steps may further be performed on other pixels in the image, that is, the image enhancement described in the foregoing steps may be performed on the entire image.

Optionally, the device may be any device supporting image processing, for example, a device such as a computer, a mobile phone, or a tablet computer.

In another optional embodiment, the processor 52 is further configured to perform the following operations:

calculating a central response value of a target pixel based on an original pixel value of the target pixel, where the central response value is greater than the original pixel value;

separately calculating a second total suppression value of each neighborhood pixel, where the second total suppression value of the neighborhood pixel refers to the sum of values of suppression to the neighborhood pixel from other neighborhood pixels, and the other neighborhood pixels refer to all other neighborhood pixels in all the neighborhood pixels except the neighborhood pixel;

calculating a value of suppression to the target pixel from the neighborhood pixel based on the second total suppression value of each neighborhood pixel, where the value of suppression to the target pixel from the neighborhood pixel is T times of a suppression difference of the neighborhood pixel, the suppression difference of the neighborhood pixel is a difference obtained by subtracting the second total suppression value of the neighborhood pixel from an original pixel value of the neighborhood pixel, or the suppression difference of the neighborhood pixel is 0, and T is a value calculated based on the original pixel value of the neighborhood pixel and a value of a distance between the neighborhood pixel and the target pixel;

using the sum of the values of suppression to the target pixel from all the neighborhood pixels as a first total suppression value of the target pixel; and when the central response value is greater than the first total suppression value, subtracting the first total suppression value from the central response value, to obtain a difference, and using the difference as a pixel value of the target pixel after image enhancement; or when the central response value is less than the first total suppression value, using a value 0 as a pixel value of the target pixel after image enhancement.

As an optional implementation manner, the operation, which is performed by the processor 52, of calculating the value of suppression to the target pixel from the neighborhood pixel based on the second total suppression value of each neighborhood pixel may include:

calculating a potential function of each neighborhood pixel, where the potential function of the neighborhood pixel is a norm value of a difference obtained by subtracting the original pixel value of the target pixel from the original pixel value of the neighborhood pixel;

calculating a change rate of the potential function of each neighborhood pixel, where the change rate of the potential function refers to a ratio of a power function of the potential function to power functions of all potential functions, an exponent of the power function of the potential function is the potential function, and a base of the power function of the potential function is a preset base;

calculating a kernel value of each neighborhood pixel, where the kernel value of the neighborhood pixel is a value calculated based on the change rate of the potential function of the neighborhood pixel and the value of the distance between the neighborhood pixel and the target pixel; and calculating the value of suppression to the target pixel from the neighborhood pixel based on the second total suppression value of each neighborhood pixel, where the value of suppression to the target pixel from the neighborhood pixel is T times of the suppression difference of the neighborhood pixel, the suppression difference of the neighborhood pixel is the difference obtained by subtracting the second total suppression value of the neighborhood pixel from the original pixel value of the neighborhood pixel, or the suppression difference of the neighborhood pixel is 0, and T is a value calculated based on the original pixel value of the neighborhood pixel and the kernel value of the neighborhood pixel.

Optionally, the potential function may be shown as the following formula:

$$D(x, y) = \|I_{(x, y)} - I_{(x_0, y_0)}\|_p$$

Optionally, $D(x, y)$ represents a potential function of a neighborhood pixel $(x, y)$, and p may be equal to 1, 2, or the like, that is, p may be 1-norm, 2-norm, or the like. $I_{(x, y)}$ represents a pixel value of the neighborhood pixel $(x, y)$, and $I_{(x_0, y_0)}$ represents a pixel value of the target pixel.

Optionally, a change rate of D(x, y) may be shown as the following formula:

$$k(x, y) = \frac{\exp(D(x, y))}{\sum_{(x,y) \in N} \exp(D(x, y))}$$

where, k(x, y) may represent the change rate of D(x, y) of the neighborhood pixel (x, y), exp(D(x,y)) may represent a natural logarithm e raised to the power of D(x, y), N represents a set of all neighborhood pixels, that is, in the foregoing formula, the sum of exp(D(x, y)) of all the neighborhood pixels is calculated.

Optionally, the kernel value may be calculated by using the following formula:

$$\sigma'_{2,(x,y)} = \left(1 + \frac{k(x, y)}{4}\right) \cdot \sigma_2$$

where, $\sigma'_{2,(x, y)}$ represents a kernel value of the neighborhood pixel (x, y), and $\sigma_2$ is 1/H of a value of a distance between the neighborhood pixel (x, y) and the target pixel, where H is a preset numerical value, for example, H may be set to 3.

In this way, T in this implementation manner may be the value calculated based on the original pixel value of the neighborhood pixel and the kernel value of the neighborhood pixel, and the kernel value is calculated based on interaction between different neighborhood pixels and also by integrating adaptive interaction between the target pixel and the neighborhood pixels. Scalar adjustment is more fully performed on T by using information about a local contrast constituted by the target pixel and the neighborhood pixels. In this embodiment of the present invention, image enhancement implemented in this implementation manner is defined as a VSNRF. In the foregoing implementation manner of calculating T based on the original pixel value of the neighborhood pixel and the value of the distance between the neighborhood pixel and the target pixel, the implemented image enhancement is defined as a BNRF.

As an optional implementation manner, the operation, which is performed by the processor 52, of subtracting the first total suppression value from the central response value when the central response value is greater than the first total suppression value to obtain the difference and using the difference as the pixel value of the target pixel after image enhancement, or using the value 0 as the pixel value of the target pixel after image enhancement when the central response value is less than the first total suppression value maybe performed by using the following formula:

$$T = \max(T_c - T_N, 0) = \delta(T_c - T_N)$$

where, T represents the pixel value of the target pixel after image enhancement, $T_c$ represents the calculated central response value, and $T_N$ represents the calculated first total suppression value. The foregoing max operation makes a total response be a non-negative value, and implies a non-linear action, and δ(•) is a Kronecker delta.

As an optional implementation manner, before performing the operation of calculating the central response value of the target pixel based on the original pixel value of the target pixel, the processor 52 is further configured to perform the following operation:

setting a calculation template for image enhancement, where the template includes a central area, a neighborhood area is set for each central area, the target pixel refers to a pixel covered by the central area, and a neighborhood pixel of the target pixel refers to a pixel covered by the neighborhood area of the central area.

Optionally, the calculation template may be a 3×3 template, a 5×5 template, a 7×7 template, or the like. Quantities of central areas included by different templates may be different, for example, the 3×3 template includes one central area, and the 5×5 template may include one or more central areas.

Optionally, a size of the central area may be the same as that of one pixel in an image, that is, there is one target pixel; or a size of the central area may be the same as the sum of sizes of several pixels in an image, that is, there are multiple target pixels.

Optionally, when a neighborhood area that does not cover a pixel in an image in which the target pixel is located and does not cover a pixel exists in the neighborhood area of the central area, that is, the target pixel is an edge pixel of the image, the neighborhood pixel of the target pixel covered by the central area includes:

a pixel, which is covered by the neighborhood area of the central area, in the image, and a pixel, which is covered by a neighborhood area mirrored by the neighborhood area that does not cover a pixel, in the image; or a pixel, which is covered by the neighborhood area of the central area, in the image, that is, the neighborhood area that does not cover a pixel is set to 0.

Description is given below by using the 3×3 template as an example.

In the template shown in FIG. 4, the operation, which is performed by the processor 52, of calculating the central response value of the target pixel based on the original pixel value of the target pixel may include:

calculating the central response value of the target pixel by using the following formula:

$$T_c = I_{(x_0, y_0)} A_1 G(x_0, y_0, \sigma_1)$$

where, $T_c$ represents a central response value of the target pixel $(x_0, y_0)$, and $G(x, y, \sigma) = (1/2\pi\sigma^2) \times \exp(-(x^2+y^2)/2\sigma^2)$ is a Gaussian function; $I_{(x_0, y_0)}$ represents an original pixel value of the target pixel (x0, y0); $A_1$ is a preset response weight coefficient (for example, $A_1$32 4) of the central area, $\sigma_1$ is a parameter of the Gaussian function and represents a width of a Gaussian kernel function, and $\sigma_1$ is equal to 1/J of a radius of a central area (that is, an area in a circle shown in FIG. 4) of the 3×3 template, where J is a preset numerical value, for example, J is 3, the radius of the central area is 0.5, and therefore, $\sigma_1 = 1/6$.

In the template shown in FIG. 4, the operation, which is performed by the processor 52, of separately calculating the second total suppression value of each neighborhood pixel may include:

calculating the second total suppression value of each neighborhood pixel by using the following formula:

$$II_{(x,y)} = \sum_{(x+m, y+n) \in N\backslash(x,y)} II_{(x,y)-(x+m, y+n)} A_3 G(m, n, \sigma_3)$$

where, $II_{(x, y)}$ represents a second total suppression value of the neighborhood pixel (x, y), and N\(x, y) represents a set of all neighborhood pixels except the neighborhood pixel (x, y); and $$II_{(x, y)-(x+m, y+n)} = I_{(x+m, y+n)} A_3 G(m, n, \sigma_3)$$

where, $II_{(x, y)-(x+m, y+n)}$ represents a value of suppression to the neighborhood pixel (x+m, y+n) from a neighborhood pixel (x, y), $A_3$ is a sensitivity coefficient ) for example, $A_3=1$) between neighborhood pixels, and $\sigma_3$ is equal to 1/K of a distance between two neighborhood pixels that are farthest from each other in the template shown in FIG. 4, where K is a preset numerical value, for example, K is 3, and $\sigma_3=0.94$. The distance between the two neighborhood pixels that are farthest from each other in the template shown in FIG. 4 is $2\sqrt{2}$, and therefore $\sigma_3=2\sqrt{2}/3$.

In the template shown in FIG. 4, the operation, which is performed by the processor 52, of calculating the value of suppression to the target pixel from the neighborhood pixel based on the second total suppression value of each neighborhood pixel may include:

calculating the value of suppression to the target pixel from each neighborhood pixel by using the following formula:

$$III_{(x, y)} = \max\{A_2 G(x, y, \sigma_2)(I_{(x, y)} - II_{(x, y)}), 0\} \delta(A_2 G(x, y, \sigma_2)(I_{(x, y)} - II_{(x, y)}))$$

where, $III_{(x, y)}$ represents a value of suppression to the target pixel (x, y) from the neighborhood pixel $(x_0, y_0)$, $A_2$ is a sensitivity of suppression to the target pixel from a neighborhood pixel, $I_{(x, y)}$ is a pixel value of the neighborhood pixel (x, y); $\sigma_2$ is a parameter of a Gaussian function, and $\sigma_2$ is equal to 1/H of a value of a distance between the target pixel $(x_0, y_0)$ and the neighborhood pixel (x, y), where H is a preset numerical value, for example, H may be set to 3, and $\sigma_2=0.47$. The max operation makes a suppression effect be a non-negative value, and implies a non-linear action, and $\delta(\bullet)$ is a Kronecker delta.

Optionally, in the VSNRF implementation manner, $\sigma_2$ in the foregoing formula may be $\sigma'_{2,(x, y)}$. In the BNRF implementation manner, $\sigma_2$ in the foregoing formula may be equal to 1/H of the value of the distance between the target pixel $(x_0, y_0)$ and the neighborhood pixel (x, y).

In the template shown in FIG. 4, the operation, which is performed by the processor 52, of using the sum of the values of suppression to the target pixel from all the neighborhood pixels as the first total suppression value of the target pixel may include:

using the sum of the values of suppression to the target pixel from all the neighborhood pixels as the first total suppression value of the target pixel by calculation using the following formula:

$$T_N = \sum_{(x,y) \in N} III_{(x,y)}$$

where, $T_N$ represents the first total suppression value, and N represents a set of neighborhood pixels, where there are 8 neighborhood pixels in total in this template.

As an optional implementation manner, in the foregoing method, image enhancement processing may be performed only on a grayscale image or a black-and-white image, and image enhancement processing may also be performed on a color image. However, for a color image, image enhancement processing shown in the foregoing method may be successively performed on three channels of RGB.

In the foregoing technical solution, a central response value of a target pixel is calculated based on an original pixel value of the target pixel, where the central response value is greater than the original pixel value; a first total suppression value of the target pixel is calculated, where the first total suppression value is the sum of values of suppression to the target pixel from all neighborhood pixels of the target pixel, the neighborhood pixels are specified as neighborhood pixels of the target pixel in advance, and the values of suppression to the target pixel from the neighborhood pixels refer to values representing suppression effects imposed by the neighborhood pixels on the target pixel; and when the central response value is greater than the first total suppression value, the first total suppression value is subtracted from the central response value, to obtain a difference, and the difference is used as a pixel value of the target pixel after image enhancement; or when the central response value is less than the first total suppression value, a value 0 is used as a pixel value of the target pixel after image enhancement. In this way, because image enhancement of the target pixel depends on the original pixel value of the target pixel and original pixel values of other neighborhood pixels, compared with the prior art in which only simple power transformation is performed on a pixel value of a pixel, an image after image enhancement is delicate in this embodiment of the present invention.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), a random access memory (RAM), or the like.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. An image enhancement method comprising:
    obtaining, by a processor, a central response value of a target pixel based on an original pixel value of the target pixel,
        wherein the central response value is greater than the original pixel value, and the central response value is obtained from a first product that is a product of the original pixel value of the target pixel with a preset response weight coefficient of a central area and a first Gaussian kernel function,
        wherein the first Gaussian kernel function is a function of a location of the target pixel and a first kernel parameter obtained from a product of a multiplicative inverse of a first numerical value and a radius of the central area;
    obtaining, by the processor, a first total suppression value of the target pixel, wherein the first total suppression value is a first sum that is a sum of values of suppression to the target pixel from all neighboring pixels of the target pixel, the neighboring pixels are specified as neighboring pixels of the target pixel in advance, and the values of suppression to the target pixel from the neighboring pixels refer to values representing suppression effects imposed by the neighboring pixels on the target pixel,
        wherein a value representing a suppression effect imposed by a neighboring pixel on the target pixel is obtained from a second product when the second product is a positive value and a product of a sensitivity of suppression to the target pixel from a neighboring pixel a second Gaussian kernel function and a first difference obtained by excluding a second total suppression value from a pixel value of the neighboring pixel, wherein the second Gaussian kernel function is dependent on the location of the neighboring pixel and a second kernel parameter dependent on a distance between the targeted pixel and the neighboring pixel, wherein when the second product is not a positive value, the value representing the suppression effect imposed by the neighboring pixel on the target pixel is obtained as 0; and when the central response value is greater than the first total suppression value, obtaining, by the processor, as a pixel value of the target pixel after image enhancement, a difference obtained by excluding the first total suppression value from the central response value; and when the central response value is less than the first total suppression value, obtaining, by the processor, a value of 0 as the pixel value of the target pixel after image enhancement.

2. The method according to claim 1, wherein the obtaining, by the processor, the first total suppression value of the target pixel further comprises:

separately obtaining, by the processor, a second total suppression value of each neighboring pixel, wherein the second total suppression value is obtained from a sum of values of suppression to the neighboring pixel from other neighboring pixels, wherein the other neighboring pixels refer to remaining neighboring pixels of all the neighboring pixels other than the neighboring pixel;

obtaining, by the processor, a value of suppression to the target pixel from the neighboring pixel based on the second total suppression value of each neighboring pixel, wherein:

the value of suppression to the target pixel from the neighboring pixel is T times of a suppression difference of the neighborhood pixel, the suppression difference of the neighboring pixel is one of 0 and a difference obtained by excluding the second total suppression value of the neighboring pixel from an original pixel value of the neighboring pixel, and T is a value obtained based on the original pixel value of the neighboring pixel and a value of a distance between the neighboring pixel and the target pixel.

3. The method according to claim 2, wherein the obtaining the value of suppression to the target pixel from the neighborhood pixel based on the second total suppression value of each neighboring pixel comprises:

obtaining, by the processor, a potential function of each neighboring pixel, wherein the potential function is a norm value of a difference obtained by excluding the original pixel value of the target pixel from the original pixel value of the neighboring pixel;

obtaining, by the processor, a change rate of the potential function of each neighboring pixel, wherein the change rate of the potential function is obtained from a ratio of:

a power function of the potential function of the neighboring pixel to a summation of all power functions of potential functions of all the neighboring pixels, wherein a base of the function of the potential function is a preset base;

obtaining, by the processor, a kernel value of each neighborhood pixel, wherein the kernel value is a value obtained based on the change rate of the potential function of the neighboring pixel and the value of the distance between the neighboring pixel and the target pixel; and obtaining, by the processor, the value of suppression to the target pixel from the neighboring pixel based on the second total suppression value of each neighboring pixel, wherein the value of suppression to the target pixel from the neighborhood pixel is T times of the suppression difference of the neighborhood pixel, the suppression difference of the neighborhood pixel is one of 0 and the difference obtained by excluding the second total suppression value of the neighboring pixel from the original pixel value of the neighborhood pixel, and T is a value obtained based on the original pixel value of the neighboring pixel and the kernel value of the neighboring pixel.

4. The method according claim 1, wherein before the obtaining, by the processor, the central response value of the target pixel based on the original pixel value of the target pixel, the method further comprises:

setting a template for image enhancement, by the processor, wherein the template comprises a central area, a neighboring area is set for the central area, the target pixel refers to a pixel covered by the central area, and a neighboring pixel of the target pixel refers to a pixel covered by the neighboring area of the central area.

5. The method according to claim 4, wherein when a neighboring area that does not cover a pixel in an image in which the target pixel is located and does not cover a pixel in the neighboring area of the central area exists, the neighboring pixel of the target pixel comprises one of:

a pixel in the image that is covered by the neighboring area of the central area;

a pixel in the image that is covered by an area mirrored by the neighboring area, wherein the neighboring area does not cover the pixel; and a pixel in the image that is covered by the neighboring area of the central area;

wherein the target pixel is covered by the central area.

6. An image enhancement device comprising a processor; and a non-transitory computer-readable storage medium including computer-executable instructions executed by the processor to perform operations comprising:

obtaining a central response value of a target pixel based on an original pixel value of the target pixel, wherein the central response value is greater than the original pixel value, and the central response value is obtained from a first product, wherein the first product is a product of the original pixel value of the target pixel with a preset response weight coefficient of a central area and a first Gaussian kernel function, wherein the first Gaussian kernel function is a function of a location of the target pixel and a first kernel parameter obtained from a product of a multiplicative inverse of a first numerical value and a radius of the central area;

obtaining a first total suppression value of the target pixel, wherein the first total suppression value is a first sum, wherein the first sum is a sum of values of suppression to the target pixel from all neighboring pixels of the target pixel, the neighborhood pixels are specified as neighboring pixels of the target pixel in advance, and the values of suppression to the target pixel from the neighboring pixels refer to values representing suppression effects imposed by the neighboring pixels on the target pixel, wherein a value representing a suppression effect imposed by a neighboring pixel on the target pixel is obtained from a second product, when the second product is a positive value and a product of a sensitivity of suppression to the target pixel from a neighboring pixel, a second Gaussian kernel function, and a first difference obtained by excluding a second total suppression value from a pixel value of the neighboring pixel, wherein the second Gaussian kernel function is dependent on the location of the neighboring pixel and a second kernel parameter dependent on a distance between the targeted pixel and the neighboring pixel, wherein the value representing the suppression effect imposed by the neighboring pixel on the target pixel is obtained as 0 when the second product is not a positive value;

when the central response value is greater than the first total suppression value, obtaining, as a pixel value of the target pixel after image enhancement, a difference obtained by excluding the first total suppression value from the central response value; and when the central response value is less than the first total suppression value, obtaining a value of 0 as the pixel value of the target pixel after image enhancement.

7. The device according to claim 6, wherein the obtaining the first total suppression value of the target pixel further comprises:

separately obtaining a second total suppression value of each neighboring pixel, wherein the second total suppression value is obtained from a sum of values of suppression to the neighboring pixel from other neighboring pixels, wherein the other neighboring pixels refer to remaining neighborhood pixels of all the neighboring pixels other than the neighboring pixel;

obtaining a value of suppression to the target pixel from the neighboring pixel based on the second total suppression value of each neighboring pixel, wherein:

the value of suppression to the target pixel from the neighboring pixel is T times of a suppression difference of the neighboring pixel, the suppression difference of the neighboring pixel is one of 0 and a difference obtained by excluding the second total suppression value of the neighboring pixel from an original pixel value of the neighboring pixel, and T is a value obtained in advance based on the original pixel value of the neighboring pixel and a value of a distance between the neighboring pixel and the target pixel.

8. The device according to claim 7, wherein the obtaining the value of suppression to the target pixel from the neighborhood pixel based on the second total suppression value of each neighboring pixel comprises:

obtaining a potential function of each neighboring pixel, wherein the potential function is a norm value of a difference obtained by excluding the original pixel value of the target pixel from the original pixel value of the neighboring pixel;

obtaining a change rate of the potential function of each neighboring pixel, wherein the change rate refers to is obtained from a ratio of a power function of the potential function of the neighboring pixel to a summation of all power functions of potential functions of all the neighboring pixels, wherein a base of the power function of the potential function is a preset base;

obtaining a kernel value of each neighboring pixel, wherein the kernel value is a value obtained based on the change rate of the potential function of the neighboring pixel and the value of the distance between the neighboring pixel and the target pixel; and obtaining the value of suppression to the target pixel from the neighboring pixel based on the second total suppression value of each neighboring pixel, wherein the value of suppression to the target pixel from the neighboring pixel is T times of the suppression difference of the neighboring pixel, the suppression difference of the neighboring pixel is one of 0 and the difference obtained by excluding the second total suppression value of the neighboring pixel from the original pixel value of the neighboring pixel, and T is a value obtained in advance based on the original pixel value of the neighboring pixel and the kernel function of the neighboring pixel.

9. The device according to claim 6, wherein the before the obtaining the central response value of the a target pixel based on the an original pixel value of the target pixel, the operations further comprise:

setting a template for image enhancement, wherein the template comprises a central area, a neighboring area is set for the central area, the target pixel refers to a pixel covered by the central area, and a neighboring pixel of the target pixel refers to a pixel covered by the neighboring area of the central area.

10. The device according to claim 9, wherein when a neighboring area that does not cover a pixel in an image in which the target pixel is located and does not cover a pixel in the neighboring area of the central area exists, the neighboring pixel of the target pixel comprises one of:

a pixel in the image that is covered by the neighboring area of the central area;

a pixel in the image that is covered by an area mirrored by the neighboring area, wherein the neighboring area does not cover the pixel; and a pixel in the image that is covered by the neighboring area of the central area;

wherein the target pixel is covered by the central area.

* * * * *